United States Patent Office 3,114,128
Patented Dec. 10, 1963

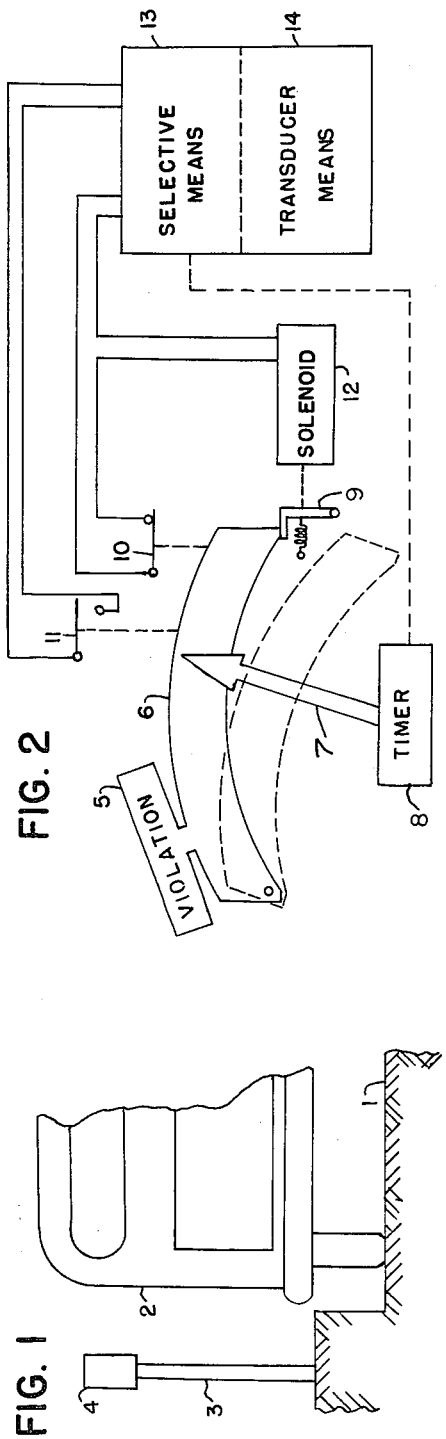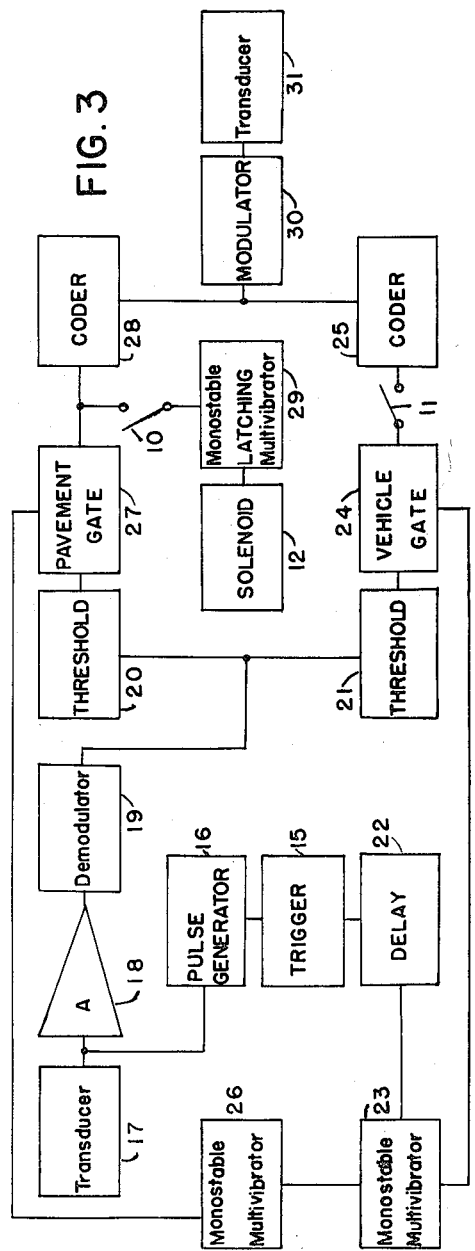

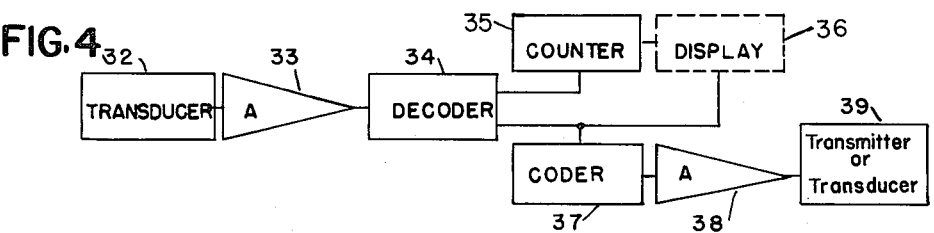
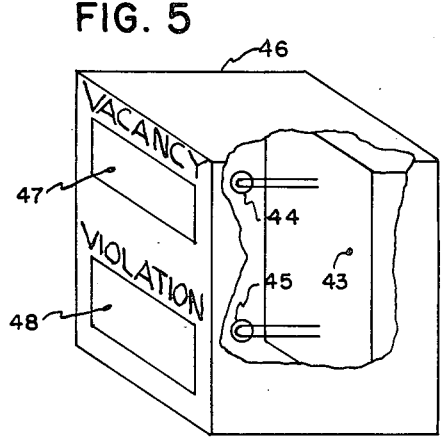
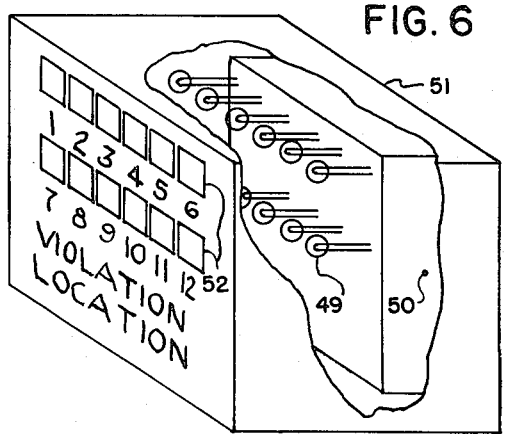
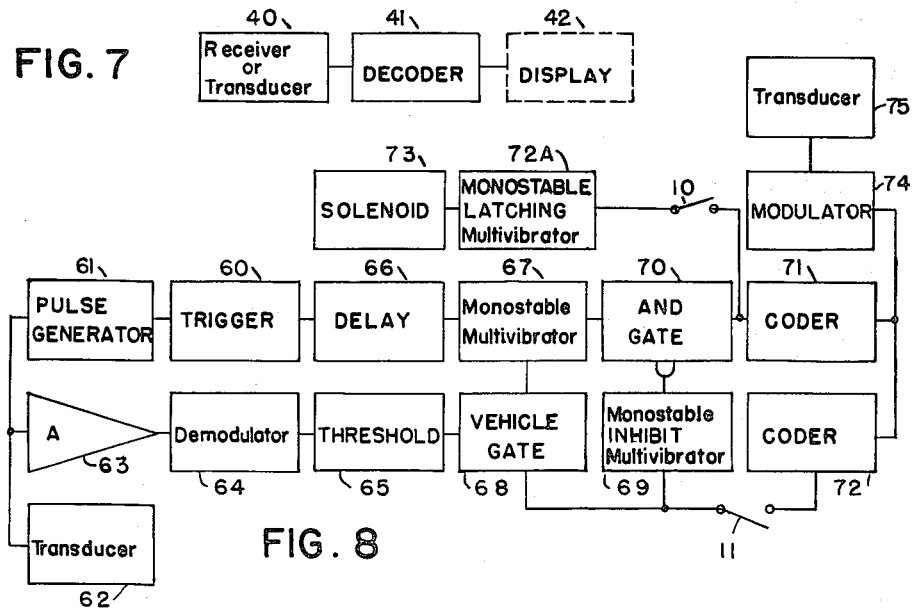

3,114,128
VEHICULAR PARKING SYSTEMS
Nils H. Ljungman, Bryn Mawr, Pa. (218 Forrest Ave., Narberth, Pa.), and James E. Brown, Jr., Philadelphia, Pa. (Chetwynd Apt., Rosemont, Pa.)
Filed Dec. 19, 1961, Ser. No. 160,617
16 Claims. (Cl. 340—51)

This invention relates to vehicular parking systems of the sensing type and has for an object the provision of a system utilizing ultrasonic energy to sense the presence and absence of vehicles in a parking space both during and after the expiration of the parking time as indicated on a parking meter. Presently, non-sensing parking meters, that is, meters without any way of detecting the presence of a vehicle next to them, are losing a great deal of revenue due to the fact that when a space has been paid for by a motorist, it can be occupied by another vehicle without any extra fee being paid. A great deal of the traffic congestion in city areas is self-generating, that is, when congestion exists, cars are forced to cruise around looking for a vacant parking space thereby to congest the area even more.

In congested areas, at present the enforcement of violations is only possible with policemen or women on foot or in motor vehicles who must look at each meter individually to observe if the small red violation flag is visible. This is expensive and wasteful of police time.

Though a number of sensing parking meters have been developed, none appears very practical. Some of these meters have a magnetic sensing device which detects the presence of a vehicle in the proximity of the meter. This system is unreliable because it can be disturbed by the great variety of electrical and magnetic signals found in cities and generated by power lines, generators, trolleys, etc. By installing a complex integrating memory circuit, the reliability of the magnetic systems can be improved. However, the cost appears prohibitive. Moreover, a magnetic system is easily tampered with by use of a permanent magnet in the vicinity of the magnetic sensing elements. The suspension of the magnetic sensing device is also very sensitive and hence subject to street vibrations. It can become inoperable very easily.

Another class of sensing meters uses the photoelectric cell. The light sensing parking meters are divided into two groups: one which transmits a beam to a photocell which is broken by the vehicle and another, a passive system, which is dependent upon incident light being blocked by the vehicle, as this is the only way that this system could detect the presence of a vehicle. Either photocell system is made easily inoperable by ice or snow or grime obstructing the photocell or light source. The passive system, by its nature, must operate over a very large range of light, e.g. from dark to light, from noon to midnight. In the passive system, a complex system could be devised to circumvent this difficulty but at great expense and with poor reliability. These light sensing systems are sensitive to dirt and grime which cover most cities. Pranksters can easily cover the photocells or light source with paper, gum, etc., making them inoperable. The pranksters could also use a flashlight to make the meters register vacant.

Still another class of sensing parking meters has pressure sensitive switches embedded in the pavement. This system is expensive to install and is prone to wear and contact trouble.

In accordance with the present invention, the presence or absence of a vehicle in a parking area is at all times detected by directing into that parking area a succession of ultrasonic pulses. Ultrasonic energy directed into the parking area will be reflected back to a transducer, preferably located within the parking meter housing, either from the vehicle itself or from the vehicle roadbed. Thus, with a series of time-spaced pulses of ultrasonic energy with the time intervals therebetween providing receiving intervals, there will be known whether or not the vehicle is present or whether or not the echo has been received after a longer time interval from the more distant roadbed. If a vehicle departs prior to the expiration of the time on the parking meter, a tripping circuit is provided so that the parking meter is again set to time zero. This means a substantial saving for a city or a township in that as soon as vehicles depart from a parking area, the meter is reset to zero and in readiness to receive additional payment for the subsequent vehicle utilizing the parking space. Where traffic is congested, it is desirable that signals be provided for oncoming motorists to tell them in which street there will be a parking area vacant. Thus, as each meter is set to time zero by the selective response of the ultrasonic energy from the parking area, a transducer or transmitter will direct to a signaling device, suitably located on the pole supporting a traffic light or other convenient support, an indication that there will be one or more parking areas available in the particular block. In the same way, the presence of a signal from a parking area after the meter has expired, and with the vehicle present, can be utilized for energization of a transmitter to signal to the aforementioned convenient support or to a central location an indication that there is a parking violation. This will aid greatly in the policing of parking areas and by further avoidance of congestion due to parking violations.

Until the past few years transducers or high acoustical electrical (acoustical units/volt) efficiency have been unattainable for commercial applications. Rochelle salt with a high efficiency has been attainable but it is soluble in water and thus not commercially feasible especially where a unit is exposed to the elements of weather. Quartz, another piezoelectric transducer, has low acoustic efficiency requiring very high voltages, up to the range of kilovolts to radiate an ultrasonic signal which is practical.

Magnetostrictive transducers are limited primarily in frequency range. The highest frequencies are not much above 25–35 kc. without a great drop of acoustic efficiency. Electromechanical resonances above the lowest ultrasonic range are very difficult if not impossible to obtain.

During the past few years such materials as lead zirconate titanate with very high acoustic efficiency within a wide range of ultrasonic frequencies have been developed and marketed as ultrasonic transducers. Unlike the Rochelle salt, they are not soluble in water. With ultrasonic transducers of lead zirconate titanate, low voltages are practicable. Therefore, battery operation of the entire circuitry is feasible which reduces installation costs appreciably. Otherwise, with a power mains system, a line must be connected from each meter to the sixty-cycle power lines and then rectified (or a special D.C. line installed) to provide power for transistor or tube circuitry.

Piezoelectric ultrasonic transducers of barium titanate, which has a slightly lower acoustical efficiency than lead zirconate titanate, are available which propagate a cone of ultrasonic energy with an apex as small as six degrees.

For further objects and advantages of the invention and for several embodiments thereof, reference is to be had to the following description taken in conjunction with the accompanying drawings in which:

FIG. 1 illustrates a portion of a vehicle in its parking space and in association with a parking meter;

FIG. 2 diagrammatically illustrates one system of carrying out the invention;

FIG. 3 is a further diagrammatic illustration of a system which may be used in conjunction with the system of FIG. 2;

FIG. 4 is a diagrammatic illustration of a signaling device which may be used at a traffic light for displaying parking area vacancies to passing motorists and for displaying parking area violations to patrolling police;

FIG. 5 illustrates the apparatus which may be used for reception and display of violation and vacancy signals to passing motorists;

FIG. 6 illustrates the apparatus which may be used for reception and display of violation locations in local law enforcement agencies;

FIG. 7 is a diagrammatic illustration of a signaling device which may be used at a remote enforcement agency; and FIG. 8 is a further diagrammatic illustration of a modification of the invention.

Referring now to FIG. 1, there has been illustrated a vehicle 2 parked on a roadbed 1 adjacent a curb from which there is supported on a post 3 a parking meter 4. This parking meter may be of any conventional type which is set from time zero to a predetermined interval of time which is ordinarily determined by the value of the coin inserted therein. In normal course after the selected time interval has expired, the meter trips to time zero and a violation flag 5, as shown in FIG. 2, appears.

Referring now to FIG. 2, there is illustrated a timer 8 which is set into operation for a predetermined length of time by the insertion of a coin in the parking meter. A pointer 7 indicates on time scale 6 the amount of time paid and remaining on the meter. The violation flag 5 moves into view upon tripping of the time scale 6. Selective means 13 operable by timer 8 at the end of a parking interval energizes solenoid 12 which releases catch 9 so that the violation flag 5 and time scale 6, which are integral, are drawn by gravity to the dotted line position. Switches 10 and 11 indicate electrically whether or not the violation flag 5 is displayed, that is, whether or not the violation flag 5 is in its down position. Transducer means 14 in conjunction with selective means 13 are described in detail in FIGS. 3 and 8.

In accordance with the present invention, there will be included in the housing of the meter 4 or in close association therewith a transducer 17, FIG. 3, which will be utilized for directing into the space occupied by vehicle 2 of FIG. 1 pulses of ultrasonic energy time-spaced one from the other. During the intervals between the pulses of directed ultrasonic energy, the transducer 17 will be responsive to directed ultrasonic energy reflected from the vehicle 2 of FIG. 1 and in its absence may be responsive to the energy reflected from the roadbed 1 of FIG. 1. The time required for the energy to travel from the vehicle will be much shorter than that required from the roadbed, and thus the system of FIG. 3 will discriminate between the two signals and use may be made of either or both as will be explained. To produce the train of pulses for energizing the transducer 17, there will be utilized a free running trigger or time clock 15 which applies time-spaced pulses to the pulse generator or gated oscillator 16 which in turn applies a pulse to the transducer 17 for directing the pulses of ultrasonic energy into the space occupied by the vehicle 2, as shown in FIG. 1. During the receiving interval, the transducer 17 applies to amplifier 18 and to demodulator 19 the received signal. Inasmuch as received signals can be of any amplitude, and since the origins of ultrasonic energy are various, giving rise to reflections other than those transmitted by transducer 17, there are utilized threshold devices 20 and 21. Thus, unless ultrasonic energy of minimum amplitude is received, no signals will be passed through these threshold devices 20 and 21. Advantage is also taken between the time intervals to distinguish the signals from the vehicle and roadbed.

Thus, when trigger 15 applies a pulse to pulse generator 16, it also pulses a delay means 22, which may be a monostable multivibrator or a delay line. After a time interval, the delay means 22 applies a signal to the monostable multivibrator 23 which opens the vehicle gate 24. Until the gates 24 or 27 have been opened, no signals will be transmitted either to coder 25 or 28, and hence the application of pulses from the pulse generator 16 to the amplifier 18 and demodulator 19 and simultaneously to the transducer 17 does no harm since they are not passed beyond gates 24 and 27.

The spacing between the transmitted pulses will be of the order of one second though it need be but long enough to assure the round trip of the generated ultrasonic pulse over its longest travel path, i.e., from transducer to its roadbed and return. The time interval between generation of each ultrasonic pulse and its return over its shortest path (from vehicle to transducer) to the transducer is still finite and long enough to permit amplifier 18 to recover from the larger transmitted-signal and to respond to the reflected signal. The monostable multivibrator 23 having its state changed by a pulse from delay means 22 opens and holds open "vehicle" gate 24. After a predetermined interval has elapsed, monostable multivibrator 23 automatically reverts to its original stable state and closes gate 24. The reverting of monostable multivibrator 23 to its stable state produces a pulse which energizes monostable multivibrator 26 causing it to change state, thereby opening and holding open roadbed gate 27. Therefore, any signal passing gate 27 will be due to a reflection of ultrasonic energy from the roadbed during the absence of a vehicle. The roadbed signal cannot originate from the roadbed when a vehicle is present.

The monostable multivibrator 26 will after a predetermined interval has elapsed revert to its stable state thereby closing roadbed gate 27. With the foregoing in mind, and with reference to FIG. 3, if a vehicle is present in the parking area of FIG. 1, the reflected ultrasonic energy will cause the transducer 17 to generate a pulse which will pass through the vehicle gate 24. If switch 11 is closed, the coder 25 will modify the signal and apply it to modulator 30 whereupon it will energize transducer 31 which will issue an ultrasonic signal whose nature will signify a violation. As shown in FIG. 2, the aforementioned switch 11 will be closed whenever the parking space is unoccupied or the meter times out. The switch 11 is actuated at the time the violation flag 5 is automatically displayed. As will be explained, the flag 5 is also automatically displayed whenever the vehicle 2 leaves the parking space.

In a similar manner, if a vehicle be not present a signal will pass through roadbed gate 27 whereupon it will be modified by coder 28 and will energize a modulator 30 and a transducer 31 as a vacancy signal. The aforementioned signal from gate 27 will, if switch 10 be closed, energize solenoid 12 which will act to display flag 5 of FIG. 2. Switch 10 is closed when the meter of FIG. 2 is put into operation and opens when the violation flag 5 is displayed.

We now have at transducer 31 either a violation or a vacancy signal which can be distinguished from each other. The coders 25 and 28, as shown in FIG. 3, and coders 71 and 72, as shown in FIG. 8, can be constructed in a multiplicity of ways. One such coder is comprised of a monostable multivibrator which energizes modulator 30, as shown in FIG. 3, which in this case will be a pulse generator. The monostable multivibrator 25 energizes the pulse generator 30 for a predetermined time interval. By having different intervals of time of the unstable states of the two coders, monostable multivibrators 25 and 28, as shown in FIG. 3 (71 and 72 as shown in FIG. 8) signals of different duration are transmitted to the central location where these signals on a time basis can be easily distinguished by the decoder 34, as shown in FIG. 4.

Decoder 34 consists of a demodulator and an integrator which integrates the envelope of pulses received from amplifier 33. If the integrated value exceeds a predetermined magnitude, the signal represents a violation. If it does not, the signal represents a vacancy as the violation pulse is longer than the vacancy pulse. Two Schmitt triggers in the decoder 34 are used to determine the magnitude of the integrated signals. The Schmitt triggers are interconnected so that the violation Schmitt trigger inhibits the vacancy output from decoder 34 so that a violation is not counted as a vacancy.

Another method applicable to the system of FIG. 3 includes coders 25 and 28 each having its own modulator 30. These modulators oscillate at different frequencies. A frequency sensitive decoder 34, FIG. 4, easily distinguishes between a violation at one frequency and a vacancy at another frequency.

Further, in accordance with the present invention, FIG. 8, as in the case of FIG. 3, illustrates another form of the transducer means 14 and the selective means 13 of FIG. 2. In the same manner as FIG. 3, a free-running trigger or time clock 60 applies time-spaced pulses to the pulse generator 61 which in turns applies time-spaced pulses to the transducer 62 for directing pulses of ultrasonic energy into the space occupied by the vehicle 2, as shown in FIG. 1. During each receiving interval, the transducer 62 applies to amplifier 63 and to demodulator 64 the received signal. Inasmuch as received signals can be of any amplitude and since the origins of ultrasonic energy are various and, therefore, will be other than reflections of those transmitted by transducer 62, there is utilized a threshold device 65. Thus, unless ultrasonic energy of minimum amplitude is received, no signal will be passed through threshold device 65. When trigger 60 applies a pulse to pulse generator 61, it also pulses delay means 66 which, after a time interval, applies a signal to a monostable multivibrator 67 which opens "vehicle" gate 68. The monostable multivibrator 67 having its state changed by the pulse from delay means 66 opens and holds open "vehicle" gate 68. After a predetermined time interval has elapsed, monostable multivibrator 67 automatically reverts to its original stable state and closes "vehicle" gate 68.

With the foregoing in mind and with reference to FIG. 8, if a vehicle 1, as shown in FIG. 1, is present in the parking space, the reflected ultrasonic energy will cause the transducer 62 to generate a pulse which will pass gate 68. If switch 11 be closed, the coder 72 will modify the signal and apply it to the modulator 74 whereupon it will energize transducer 75 which will issue an ultrasonic signal whose nature will signify a violation. The signal from the "vehicle" gate 68 signifying the presence of a vehicle is applied to the monostable inhibit multivibrator 69 which causes it to change state and inhibit "AND" gate 70 so that no signals will be passed through "AND" gate 70. If no vehicle be present, there will be no signal returned that will be of sufficient magnitude to pass threshold 65 and "Vehicle" gate 68. Therefore, monostable inhibit multivibrator 69 will not be energized and no inhibit will be put on "AND" gate 70. When and only when monostable multivibrator 67 reverts to its stable state can a pulse be transmitted to "AND" gate 70 which is open because of the lack of an inhibit signal from monostable inhibit multivibrator 69. The pulse from monostable multivibrator 67 is, therefore, transmitted through "AND" gate 70 and when switch 10 is closed energizes monostable latching multivibrator 72A which energizes solenoid 73 for a sufficient time to allow violation flag 5 and scale 6, as shown in FIG. 2, to fall to the dotted position. The pulse from "AND" gate 70 passes through coder 71 where it is modified to denote a vacancy and applied to modulator 74 which energizes transducer 75 as a vacancy signal.

As a further embodiment of the invention and with reference to FIG. 4, when the ultrasonic violation and vacancy signals are transmitted from transducers 31 or 75, as shown in FIGS. 3 and 8, these ultrasonic signals will be received by transducer 32 which will generate a signal which will be applied to amplifier 33 and decoder 34 which differentiates between violation and vacancy signals. The vacancy signals are applied to a counter 35 wherein the number of vacancies are counted and then applied to a display means 36 where the presence of a vacancy or the number of vacancies in an area can be presented for viewing by passing motorists. The violation signals from decoder 34 are applied to coder 37 and display means 36. The violation signals are coded in coder 37 to designate the area of the violation, then applied to amplifier 38 and relayed by transmitter or transducer 39 to a receiver 40, as shown in FIG. 7. The violation signals from decoder 34 are also applied to display means 36 where they can be displayed for viewing. The display means 36 may be of the type shown in FIG. 5 where the various components of FIG. 4 are housed in 43. The arrangement of FIG. 5, for convenience, provides for the display of singular violations and vacancies. Provision is made for display of all vacancies by counter 35, as shown in FIG. 4. Referring again to FIG. 5, a signal is applied to light 44 by counter 35 and a signal is applied to light 45 by decoder 34. Visual observance of the lights 44 and 45 (shielded one from the other by a dividing wall not shown) is provided by openings 47 and 48 in housing 46. Housing 46 will be mounted on a traffic light pole or other suitable support.

As a further embodiment of the invention and with reference to FIG. 7, reception of violation signals from transmitter or transducer 39 in FIG. 4 is accomplished by receiver or transducer 40. A signal is generated by receiver or transducer 40 which is applied to decoder 41 which applies a signal to its proper output in display 42. Since the signals applied to decoder 41 where previously coded by coder 37, as shown in FIG. 4, to designate the area of violation occurrence, decoder 41 will be able to choose the proper lamp of lights 49 to coincide with the area designations 52 as shown in FIG. 6. Referring to FIG. 6, all the component parts of FIG. 7 will be located in housing 50 from which decoder 41 of FIG. 7 there will be applied a signal to one of the various lights 49, which light will be observed through windows 52 of housing 51.

Because of the large number of ultrasonic parking meters which may be in operation in a city, the gating system is open for the shortest time possible and a threshold gate is provided to suppress spurious signals from other meters. By choosing an ultrasonic frequency above 80–100 kc./s., the attenuation of our ultrasonic signal in air will be very much greater than in the 25–80 kc./s. range where there is inappreciable absorption of the ultrasonic energy by the air. Above 80–100 kc./s., the air absorbs ultrasonic energy very appreciably and this phenomenon increases into the megacycle range where resonance of the diatomic molecules in air takes place and another phenomenon occurs. However, our range of interest lies from 100 kc./s. to hundreds of kc./s. In this range a frequency is chosen which gives adequate propagation characteristics for the short range to the motor vehicle and roadbed but which is attenuated (DB/meter) very strongly so that all spurious signals will be suppressed below the dynamic range of amplifiers 18 and 63 and gates 20 and 21. In this manner, threshold devices 20, 21 and 65 can be eliminated since the air at ultrasonic frequencies over 100 kc./s. attenuates greatly all signals from a distance greater than a few feet. Another advantage inherent with a higher frequency is an ultrasonic transducer 17 and 62 of smaller physical dimensions which compresses the size of our entire unit making it more easily installed in already existing parking meter equipment on the streets of cities and townships today.

It is to be understood, of course, that the system diagrammatically shown in FIGS. 3, 4, 7 and 8 may be modified as desired. Those skilled in the art are familiar with the various circuits indicated by the labeled boxes of FIGS. 3, 4, 7 and 8. For example, in "Selected Semiconductor Circuits Handbook," edited by Seymour Schwartz, Wiley, 1960;

[1] "Pulse and Digital Circuits" by Jacob Millman and Herman Taub, McGraw-Hill Publishing Company—1956;

"Wave Generation and Shaping" by Leonard Strauss, McGraw-Hill—1960;

Military Standardization Handbook, "Selected Semiconductor Circuits," Mil-HdBK–215, June 15, 1960, Superseding Navships 93484, there will be found a multiplicity of examples of pulse generators, triggers, monostable multivibrators which can be easily assembled together as illustrated in FIGS. 3, 4, 7 and 8 and for the purposes of the present invention.

In summary, it will be observed that the present sensing system in utilizing the ultrasonic energy makes it possible to use simple transistorized circuitry in the form of units of conventional type and available at relatively low cost. They are also reliable and, hence, the manner in which they will cooperate with the existing parking meters makes the present invention economically feasible with great savings to operators of parking meters by coins. Not only is there shortened the time between coins where each vehicle operator uses less than the whole of the alloted time, but there is also prompt notification of violations; and more important to the community as a whole, there is an indication to those desiring to use parking spaces of where they may be found.

What is claimed is:

1. The combination with a parking meter having a zero-set mechanism operable to predetermine parking time and automatically set to zero upon expiration of said parking time,
    of transducing means for generating and directing ultrasonic energy into the parking space which can be occupied by a vehicle and for receiving ultrasonic energy reflected from said vehicle and in its absence from the roadbed,
    and selective means selectively responsive to said reflected ultrasonic energy for signaling at least one of
        (a) the presence of a vehicle after expiration of its parking time,
        (b) the absence of a vehicle both before and after expiration of said parking time.

2. The combination of claim 1 in which said selective means in response to the absence of a vehicle operates said zero-set mechanism to set said meter to time zero.

3. The combination of claim 1 in which there is provided a transducing means, and in which said selective means in response to the absence of a vehicle produces operation of said transducing means to transmit the information of the vacancy to a central location.

4. The combination of claim 1 in which there is provided a second transducing means, and in which said selective means in response to the presence of a vehicle controls the operation of said transducing means to transmit information of said presence to a central location.

5. The combination of claim 1 in which there is provided a second transducing means, and in which said selective means in response to the presence of a vehicle controls the operation of said transducing means to transmit information of said presence to a central location after expiration of said parking time.

6. The combination of claim 1 in which said selective means in response to the absence of a vehicle sets said meter to time zero, and in which there is provided a second transducing means, and in which said selective means controls the operation of said transducing means to transmit information of said vacancy to a central location.

7. The combination of claim 1 in which there is provided means for generating a train of time-spaced pulses for operating said transducing means to produce said ultrasonic energy in the form of a succession of ultrasonic pulses time-spaced from each other, the time-spacing providing time-spaced receiving intervals for said reflected ultrasonic energy.

8. The combination of claim 7 in which said selective means includes a gate, and means for operating said gate to pass only reflected ultrasonic energy from the vehicle.

9. The combination of claim 7 in which said selective means includes a gate, and means for operating said gate to pass only reflected ultrasonic energy from the roadbed.

10. The combination of claim 7 in which said selective means includes a multiplicity of gates, and means for operating said gates to distinguish between reflected ultrasonic energy from the vehicle and from the roadbed.

11. The combination of claim 1 in which said transducing means includes an amplifier, and in which said selective means is provided with a gating means, and means operated in synchronism with said transducing means for closing said gating means during production of said ultrasonic energy and opening said gate a time interval after production of said energy and during the time-occurrence of reflections of said energy to said transducer.

12. The combination of claim 11 in which threshold devices are provided between said gating means and said amplifiers for preventing passage to said gating means of output signals below a selected predetermined amplitude.

13. The combination of claim 1 in which said selective means is provided with means operable in response to the absence of a vehicle for setting said meter to time zero, and in which there are provided transmitting means for transmitting the information of the vacancy to a central location, and in which said selective means in response to the presence of a motor vehicle controls said transmitting means to transmit the information of the presence of a motor vehicle to a central location.

14. The combination of claim 7 in which said selective means is provided with means operable in response to the absence of a vehicle for setting said meter to time zero, and in which there are provided transmitting means for transmitting the information of the vacancy to a central location, and in which said selective means in response to the presence of a motor vehicle controls said transmitting means to transmit the information of the presence of a motor vehicle to a central location.

15. The combination with a parking meter having
    a zero-set mechanism operable to predetermine parking time and automatically set to zero upon expiration of said parking time,
    tripping means for setting said meter to zero before expiration of said parking time,
    transducing means for generating and directing ultrasonic energy pulses into the parking space monitored by said parking meter and which space may be occupied by a vehicle,
    pulsing means for periodically energizing said transducing means for producing said ultrasonic pulses,
    said transducing means being disposed to receive reflections of said ultrasonic pulses from a vehicle and in its absence from the roadbed,
    an output circuit,
    connections including switching means between said output circuit and said transducing means for preventing output signals during generation of said ultrasonic pulses and for development at said output circuit of signals representative of reflections produced by said ultrasonic pulses,
    and means for operating said tripping means in response to output signals from said output circuit representa-

[1] (Other sources of these conventional circuits shown by blocks herein together with their interconnections may be used.)

tive of reflections from the roadbed arising due to the absence from said parking space of said vehicle before the expiration of its parking time.

16. The combination with a coin-operated parking meter having indicating means operable after insertion of a coin from an illegal parking position to a legal parking position and including timing mechanism which after expiration of a predetermined time interval returns said indicating means to said illegal position, of a single transducer for generating and receiving ultrasonic energy and positioned to direct impulses of said energy into the parking space normally occupied by a vehicle, means for periodically energizing said transducer for directing into said space pulses of said energy with time spaces therebetween during which time spaces said energy may be reflected from a vehicle occupying said parking space, said transducer being disposed to receive reflections of said ultrasonic pulses from the vehicle and in its absence from the roadbed, tripping means for said parking meter, and selective means for operating said tripping means connected to said transducer and operable by reflections from the roadbed of said energy for tripping said meter prior to expiration of said time interval and responsive to reflections from a vehicle occupying said space for preventing operation of said tripping means without interfering with the operation of said timing means to return said indicating means from its legal parking position to its illegal parking position.

References Cited in the file of this patent

UNITED STATES PATENTS

| | | |
|---|---|---|
| 2,277,612 | Symington | Mar. 24, 1942 |
| 2,652,551 | Gumpertz et al. | Sept. 15, 1953 |